March 15, 1932.  A. J. WEATHERHEAD, JR  1,849,604
FASTENING AND CONNECTING DEVICE Filed Aug. 1, 1929

INVENTOR
A. J. WEATHERHEAD, JR.
BY Fisher, Moser & Moore
ATTORNEY

Patented Mar. 15, 1932

1,849,604

UNITED STATES PATENT OFFICE

ALBERT J. WEATHERHEAD, JR., OF CLEVELAND, OHIO

FASTENING AND CONNECTING DEVICE

Application filed August 1, 1929. Serial No. 382,624.

This invention relates to an improvement in fastening and connecting devices, and in general my object is to provide an inexpensive substitute for a screw nut, consisting of a collet or connecting ring having a spherical form or spheroidal shape, and made of hard or semi-hard metal capable of being re-shaped and extended in length by the application of pressure whereby a rigid connection and firm union between two or more pieces or parts may be readily effected, all as hereinafter more particularly described and claimed, and also exemplified in the accompanying drawings.

Figure 1:
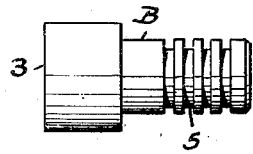
Figure 2:
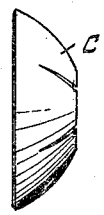
Figure 3:
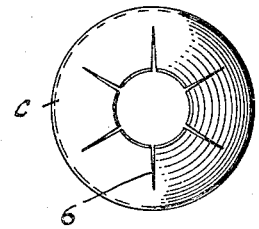
Figure 4:
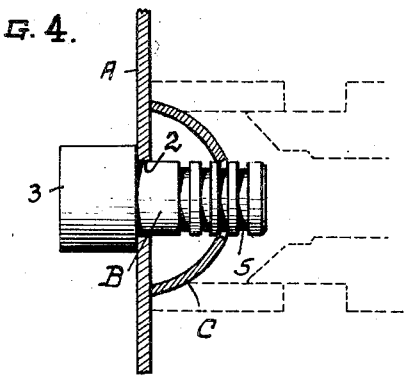
Figure 5:
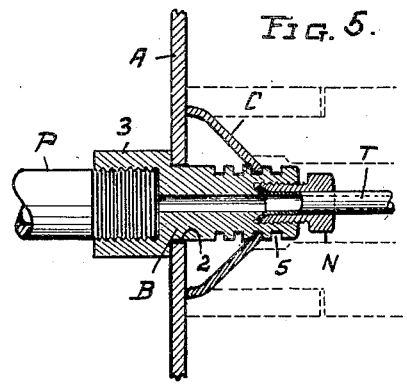
Figure 6:
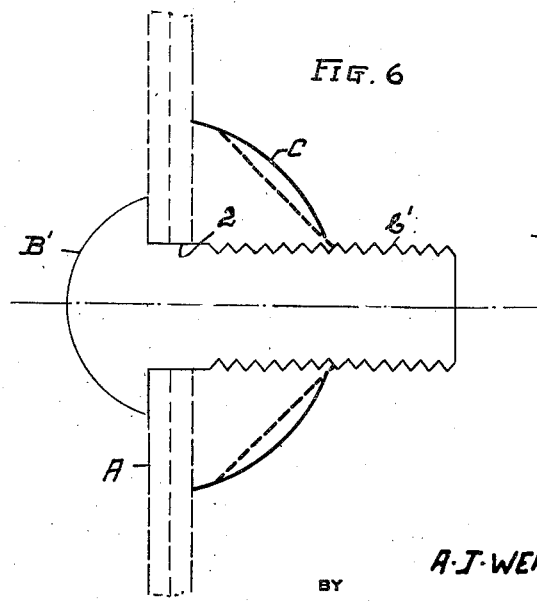
Figure 7:
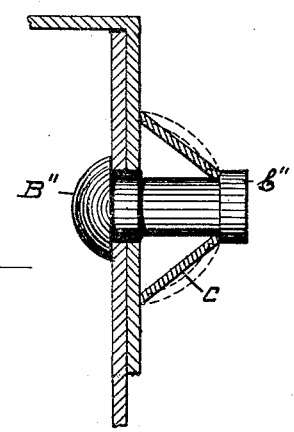

Thus, Figs. 1 and 2 are side views of a body part and a locking collet or connecting ring, respectively, constructed according to my invention, and Fig. 3 is an end view of the collet. Fig. 4 is a side elevation and sectional view of the body part and collet assembled, preliminary to fastening them together, and Fig. 5 is a sectional view of the same parts tightly interlocked. Fig. 6 is a diagrammatic view, enlarged, showing the normal shape of the collet in full lines and flattened and extended to a locking position in dotted lines. Fig. 7 is a sectional view of a modification.

The foregoing views illustrate one application of the invention to a simple assembly of parts, consisting of a flat plate A having an opening 2 therein, a round cylindrical body B having a shouldered enlargement or head 3 at one end adapted to abut against the plate when the body is passed through opening 2, and a locking collet or connecting ring C sleeved over body B. A series of circumferential grooves 5 are formed in body A, and the width of these grooves may be substantially equal to the wall thickness of collet C, which is preferably of spherical or spheroidal shape and made of relatively thick pliable metal. In other words, collet C is a rounded concavo-convex ring-shaped body made of malleable or ductile metal, hard or semi-hard, so that it may be bent or re-shaped and thereafter retain the bent shape given to it, and so that in its new shape it will be more rigid and resistant to reflexive action. To effect that result in practice, pressure is applied to its rounded surface to change its curvature or reshape it on straight lines corresponding to the chord of a circle, thereby extending the wall of the collet radially in the direction of its axis and forwardly beyond its original dimensions. To promote the reformation of the collet, the crown portion thereof is sub-divided radially by slots 6 which provide spaces wide enough to permit the tapering divisions of the wall to approach each other or come together without restraint when the curved wall is straightened and extended in length by a suitable tool or instrument applied thereto for that purpose. The annular base portion of collet C is not sub-divided so that its edge portion may rest firmly against plate A without movement or distortion when pressure is applied to the slotted area of the ring.

Accordingly, the deformation of the spherical wall to a substantially straight conical form extends or lengthens the collet so that it will interlock with body B with a forwardly crowding action, or with longitudinal pulling effect, thereby fastening body B in tight and rigid union with plate A. The deformation of collet C on straight converging lines also provides a strongly braced union between the parts, and the thickness of the wall and kind of metal employed provides a connecting device which will not yield or spring back itself, but remain in substantially the same shape and position as pressed.

The circular opening in the polar region of the spherical segment or collet C is of approximately the same diameter as body B over which it is sleeved, and a snug fit may be provided to begin with between these parts at the edge of the opening to effect immediate interlocking when the collet is pressed into a spheroidal or conical shape. The ring may be made of steel, iron, brass, or any suitable alloy adapted to permit the desired deformation to take place and thereafter retain the locking set and formation given.

In Fig. 5, I show an example of one form of fastening device embodying the features herein described, wherein body B is a tubular part having one end fashioned to connect with a screw-threaded pipe P, and its opposite end formed with a screw-threaded cavity to receive a flanged tube T and a clamping nut N. Body B in this case is approximately nine-sixteenths of an inch in diameter, and made of brass, and the collet C is also made of brass and its dimensions may be approximately one and one-half inches in diameter, with a curved wall approximately one-sixteenth of an inch in thickness. In Figs. 6 and 7, respectively, the body pieces or parts B' and B", respectively, correspond to bolts, one having a series of sharp teeth b' and the other a single locking shoulder b".

In all of the views, the various parts or pieces are firmly united and interlocked together when the curved wall of collet C is straightened between its inner and outer circumferential edges, and locking is to all intents, and purposes, permanent. However, it is possible to remove the ring and separate the parts by the aid of suitable tools or instruments. For example, a heavy blow applied annularly to the straightened wall of the collet will indent the same on concavely curved lines, or collapse and unlock the collet from body B. Striking of the collet is controlled or regulated when the collet is first applied and flattened, and for unskilled operators a suitable tool or instrument may be used to limit the force of the blow to the mere straightening operation, substantially as delineated in dotted lines in Fig. 5.

What I claim is:

1. A method of fastening parts together consisting in projecting one part through another part; sleeving a malleable concavo-convex ring over the projecting part into contact with the second part; and then applying pressure annularly to a predetermined area of the outer wall of said ring to deform the concavo-convex shape of said area to a substantially straight conical form to extend its wall radially forward beyond its original dimensions at an acute angle to the axis of said projecting part.

2. A fastening device having a base part including an opening, a cylindrical body extending through said opening having a shouldered portion externally thereof, and a split metal collet of spherical formation having an opening seated against said base part and provided with a partly flattened wall forming a cone-shaped extension for said collet, said extension being in bracing and locking union with said shoulder portion.

3. A fastening device including a base member, a body part extending through said base member and a spherical locking ring having a slitted conical extension interlocked to said body part with its slitted edge, said malleable ring forming a rounded concavo-convex ring deformed at one end to a cone-shaped extension to increase its original dimensions for interlocking action with said body part.

In testimony whereof I affix my signature.

ALBERT J. WEATHERHEAD, Jr.